(12) United States Patent
Lee et al.

(10) Patent No.: US 11,639,624 B2
(45) Date of Patent: May 2, 2023

(54) STRUCTURE FOR SHIELDING RAIL EXPOSED TO OUTSIDE OF SLIDING DOOR VEHICLE

(71) Applicants: Hyundai Motor Company, Seoul (KR); Kia Motors Corporation, Seoul (KR)

(72) Inventors: Jae-Seung Lee, Hwaseong-si (KR); Dae-Hee Lee, Incheon (KR); Kyu-Hoon Cho, Suwon-si (KR); Seung-Sik Han, Hwaseong-si (KR); Yong-Hyun Nam, Anyang-si (KR); Chung-Sik Yim, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 165 days.

(21) Appl. No.: 17/169,998

(22) Filed: Feb. 8, 2021

(65) Prior Publication Data

US 2022/0074249 A1 Mar. 10, 2022

(30) Foreign Application Priority Data

Sep. 8, 2020 (KR) .................. 10-2020-0114688

(51) Int. Cl.
*B60J 5/06* (2006.01)
*E05D 15/06* (2006.01)
*B62D 25/02* (2006.01)

(52) U.S. Cl.
CPC ............ *E05D 15/0686* (2013.01); *B60J 5/06* (2013.01); *B62D 25/025* (2013.01); *E05Y 2201/624* (2013.01); *E05Y 2201/64* (2013.01); *E05Y 2201/684* (2013.01); *E05Y 2900/531* (2013.01)

(58) Field of Classification Search
CPC . E06D 15/0686; E06D 15/10; E06D 15/0621; E06D 15/655; B60J 5/06; B60J 5/0418; B60J 5/0468; B60J 5/047; B62D 25/025; E05Y 2201/624; E05Y 2201/64; E05Y 2201/684; E05Y 2201/11;
(Continued)

(56) References Cited

U.S. PATENT DOCUMENTS 2,837,151 A * 6/1958 Stroup .................... E06B 3/485
49/495.1
4,141,179 A * 2/1979 Newson .................. E06B 7/18
49/316

(Continued)

FOREIGN PATENT DOCUMENTS

KR 1997021619 U 6/1997

*Primary Examiner* — Jerry E Redman
(74) *Attorney, Agent, or Firm* — Slater Matsil, LLP

(57) ABSTRACT

A structure for shielding a rail includes a rail configured to be mounted on a vehicle body, a drive unit movably connected to the rail, a swing arm rotatably connected to the drive unit and a sliding door, a shade bar configured to be in contact with the swing arm and connected to the drive unit so as to be movable in a first direction in which the shade bar moves close to the rail or a second direction in which the shade bar moves away from the rail, and a cover having a first end connected to the shade bar, the cover configured to open or close a space in which the rail is positioned in accordance with a movement of the drive unit.

20 Claims, 11 Drawing Sheets

(58) Field of Classification Search
CPC .......... E05Y 2900/531; E05Y 2600/41; E05D 2201/11; E05D 15/621; E05D 13/00; E05F 15/655
USPC .......................................... 49/360
See application file for complete search history.

(56) References Cited

U.S. PATENT DOCUMENTS

| | | | |
|---|---|---|---|
| 5,244,247 A * | 9/1993 | Kuwabara | E05D 3/127 296/146.12 |
| 8,123,278 B1 * | 2/2012 | McKenney | B60J 5/0479 49/320 |
| 8,484,900 B2 * | 7/2013 | Charnesky | E05B 77/12 49/502 |
| 8,839,558 B2 * | 9/2014 | Heidrich | E06B 7/21 49/470 |
| 9,022,455 B2 * | 5/2015 | Thiele | B60J 5/06 296/1.08 |
| 2005/0121939 A1 * | 6/2005 | Griffis | E06B 7/21 296/146.4 |
| 2011/0203180 A1 * | 8/2011 | Heidrich | B60J 5/0497 49/304 |
| 2012/0019023 A1 * | 1/2012 | Konchan | B60J 10/40 296/146.9 |
| 2012/0153678 A1 * | 6/2012 | Konchan | B60J 10/24 296/202 |
| 2021/0380048 A1 * | 12/2021 | Lee | B62D 25/025 |

* cited by examiner

STRUCTURE FOR SHIELDING RAIL EXPOSED TO OUTSIDE OF SLIDING DOOR VEHICLE

CROSS-REFERENCE TO RELATED APPLICATIONS

This application claims the benefit of Korean Patent Application No. 10-2020-0114688, filed on Sep. 8, 2020, in the Korean Intellectual Property Office, which application is hereby incorporated herein by reference.

TECHNICAL FIELD

The present invention relates to a structure for shielding a rail exposed to the outside of a sliding door vehicle.

BACKGROUND

In general, a vehicle has an occupant compartment having a predetermined size in which a driver or an accompanied occupant may be seated, and occupant compartment opening/closing doors are installed on a vehicle body to open or close the occupant compartment.

Sliding type occupant compartment opening/closing doors include a front sliding door installed at a front side in a longitudinal direction of a vehicle and a rear sliding door installed at a rear side in the longitudinal direction of the vehicle. The front sliding door and the rear sliding door are typically installed to be moved along rails mounted on a vehicle body or the doors.

As illustrated in FIG. 1A, referring to a structure of a vehicle equipped with sliding doors, a lower rail 20 is provided in a longitudinal direction of a vehicle body, a drive unit 30 is movably connected to the lower rail 20, and a swing arm 40 is rotatably connected to the drive unit 30 and a door 10, e.g., rear door 10b. Therefore, when external force is applied to the door 10, the drive unit 30 moves along the lower rail 20, thereby operating the door 10.

Meanwhile, side sills 50 are mounted at both sides of a lower portion of the vehicle body. The side sill 50 defines a closed cross section while including an inner side sill panel, an outer side sill panel, a reinforcing material, and the like. As illustrated in FIGS. 1B and 1C, an internal side sill space 60 is opened when the door 10 is opened. For this reason, there may be a problem in that foreign substances enter from the outside.

In order to solve the problem, Korean Utility Model Application Laid-Open No. 97-21619 (Structure for Preventing Foreign Substance from Entering Side Sill for Vehicle) discloses that a dust inflow prevention member fastened to a lower end of a door prevents foreign substances such as dust from entering a space portion formed in an upper portion of an outer panel that defines a side sill.

However, Korean Utility Model Application Laid-Open No. 97-21619 (Structure for Preventing Foreign Substance from Entering Side Sill for Vehicle) discloses a structure which is applied to a swing type opening/closing door among the opening/closing doors for a vehicle in the related art but the structure cannot be applied to the vehicle equipped with the sliding doors.

SUMMARY

The present invention relates to a structure for shielding a rail exposed to the outside of a sliding door vehicle. Particular embodiments relate to a structure for shielding a rail, which closes an internal side sill space, in which the rail is mounted, in accordance with a movement of a sliding door, thereby preventing foreign substances from entering a side sill.

Embodiments of the present invention provide a new type of structure capable of preventing foreign substances from entering an internal side sill space for a sliding door vehicle.

An exemplary embodiment of the present invention provides a structure for shielding a rail exposed to the outside of a sliding door vehicle. The structure includes a rail mounted on a vehicle body, a drive unit movably connected to the rail, a swing arm rotatably connected to the drive unit and a door, a shade bar configured to be in contact with the swing arm and connected to the drive unit so as to be movable in a direction in which the shade bar moves close to the rail or a direction in which the shade bar moves away from the rail, and a cover connected to the shade bar, at one end thereof, and configured to open or close, in accordance with the movement of the drive unit, a space in which the rail is positioned.

The rail may be mounted in an internal space of a side sill.

Guide units configured to guide a movement of the shade bar may be connected to the drive unit.

The guide units may be provided at both sides of the swing arm, the structure may further include a fixing unit fixed to the drive unit in order to support the guide unit, and the guide units may be provided with movement paths which are routes along which the shade bar is movable in a state in which two ends of the shade bar are inserted into the movement paths.

The guide unit may be provided with a first elastic member that applies elastic force to the shade bar in a direction in which the shade bar moves away from the rail.

The structure may further include a winding unit rotatably connected to the vehicle body and configured such that the cover is wound around the winding unit.

The winding unit may be provided with a second elastic member that applies elastic force in a direction in which the cover is wound.

The winding unit may be formed in a cylindrical shape.

According to embodiments of the present invention, the internal side sill space may be always closed while the door moves, thereby preventing external foreign substances from entering the internal side sill space.

According to embodiments of the present invention, since the winding unit around which the cover is wound is separately configured at one side of the lower rail, the cover may be easily replaced when the cover is damaged.

DETAILED DESCRIPTION OF ILLUSTRATIVE EMBODIMENTS

Hereinafter, exemplary embodiments of a structure for shielding a rail exposed to the outside of a sliding door vehicle according to the present invention will be described in detail with reference to the drawings. Terms or words used herein should not be interpreted as being limited to a general or dictionary meaning and should be interpreted as a meaning and a concept which conform to the technical spirit of the present invention based on a principle that an inventor can appropriately define a concept of a term in order to describe his/her own invention by the best method.

Figure 1A:
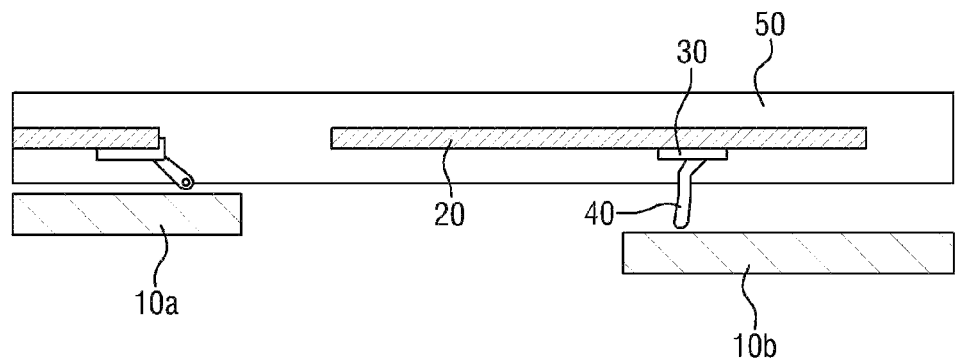
FIG. 1A is a view illustrating a state in which opposite sliding doors are operated.
Figure 1B:
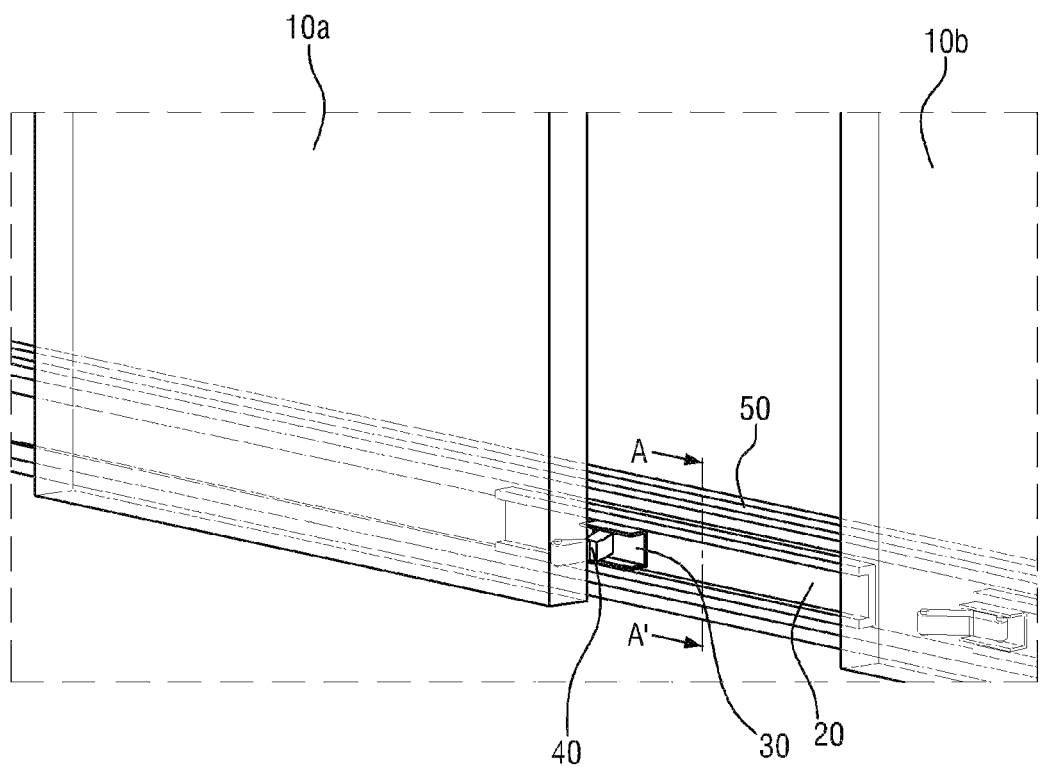
FIG. 1B is a view illustrating a state in which an internal side sill space is opened when the door is opened.
Figure 1C:
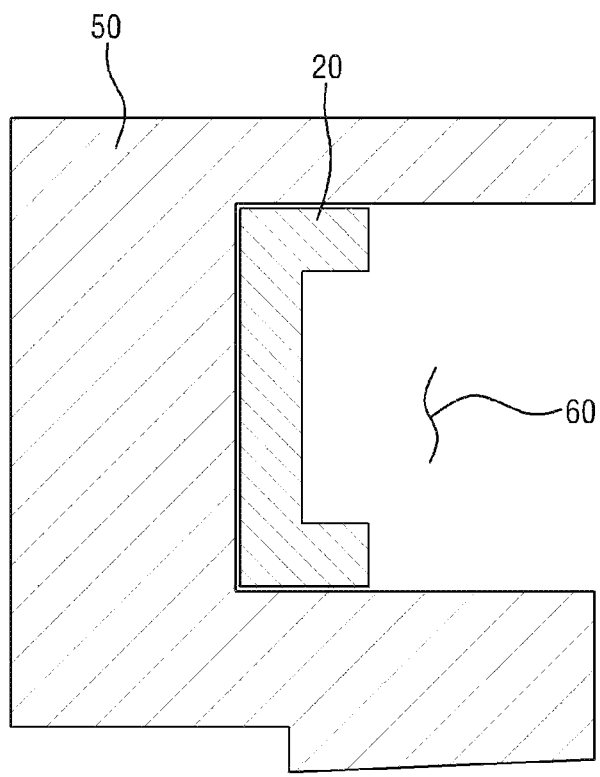
FIG. 1C is a view illustrating a part taken along line A-A' in FIG. 1B.
Figure 2:
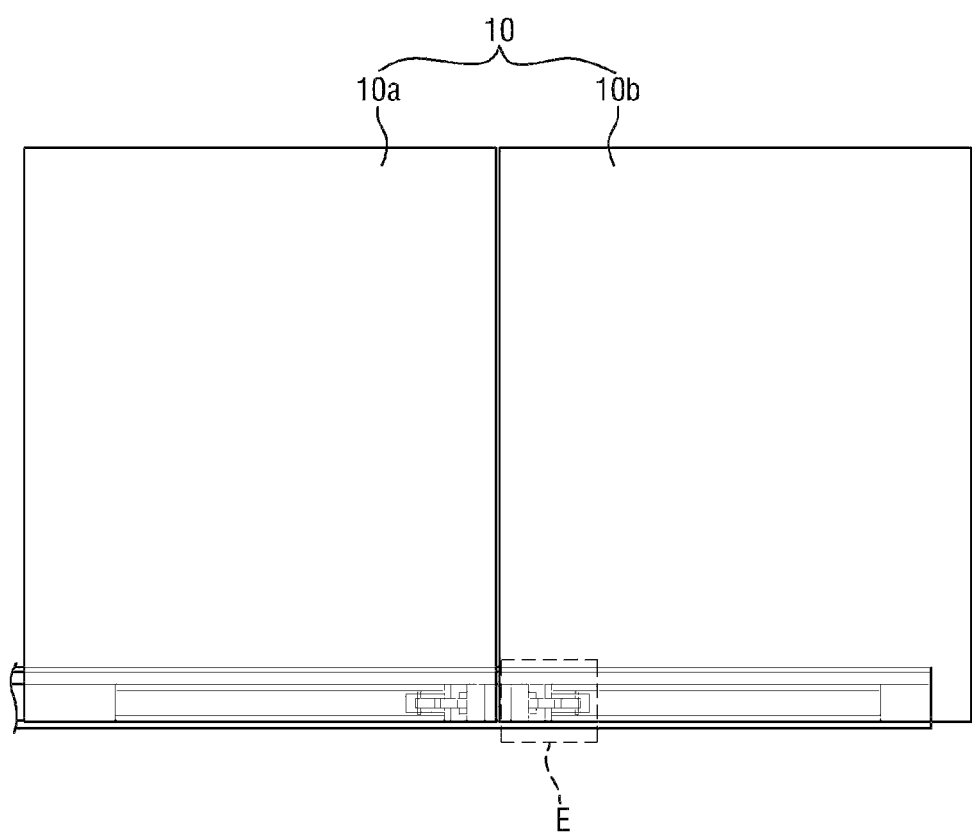
FIG. 2 is a view illustrating a structure for shielding a rail exposed to the outside of a sliding door vehicle according to an exemplary embodiment of the present invention.
Figure 3:
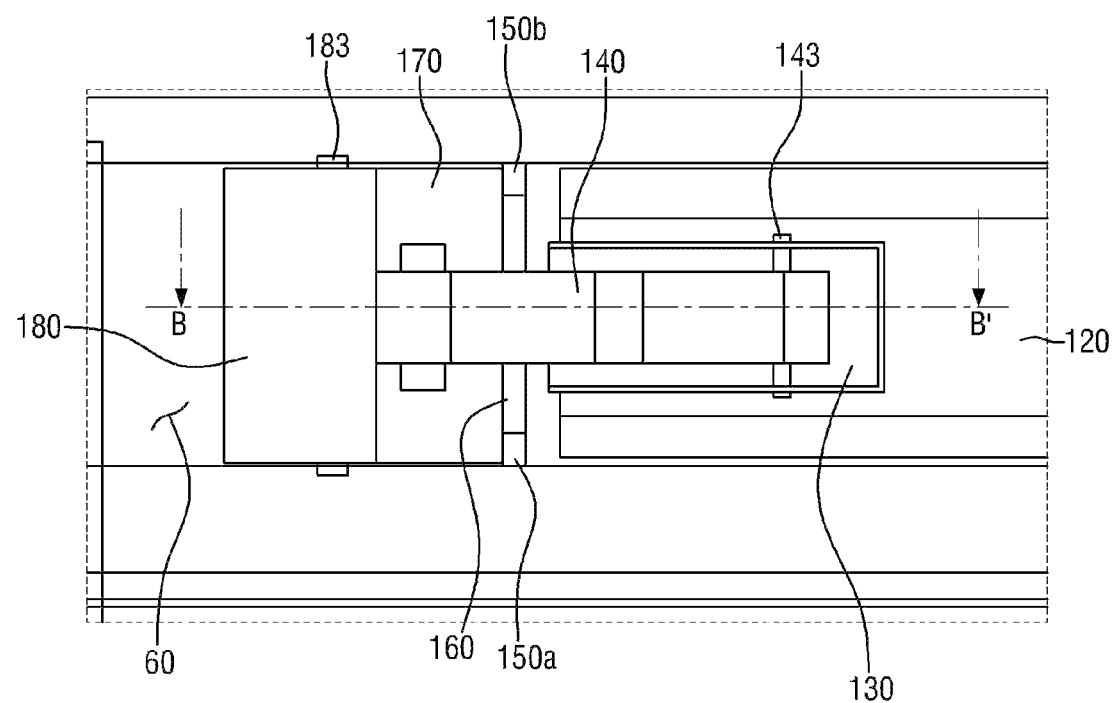
FIG. 3 is an enlarged view of part E in FIG. 2.
Figure 4:
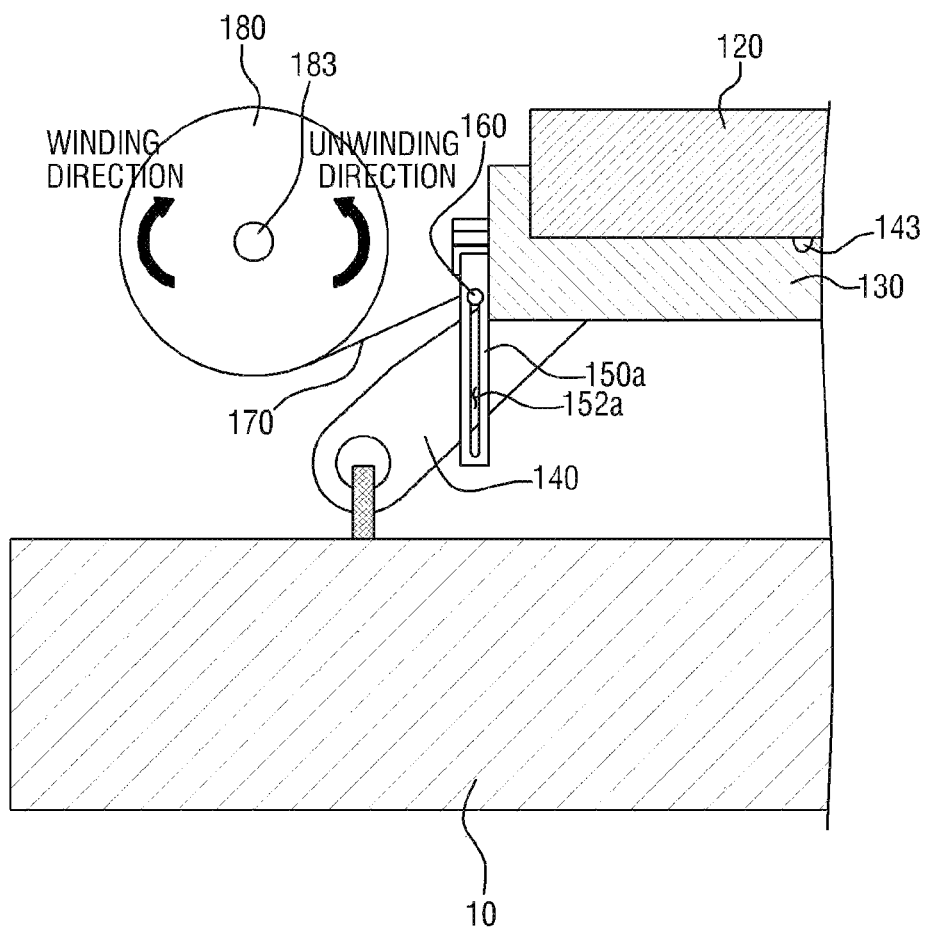
FIG. 4 is a view illustrating a part taken along line B-B' in FIG. 3.

FIG. 2 is a view illustrating a structure for shielding a rail exposed to the outside of a sliding door vehicle according to an exemplary embodiment of the present invention, FIG. 3 is an enlarged view of part E in FIG. 2, and FIG. 4 is a view illustrating a part taken along line B-B' in FIG. 3.

Referring to FIG. 2, the structure for shielding a rail exposed to the outside of a sliding door vehicle according to an exemplary embodiment of the present invention is a structure for shielding an internal space 60 of a side sill 50, which is a space in which a lower rail is mounted, so that the internal space 60 is not exposed to the outside while a door 10 moves.

Meanwhile, the shielding structures according to an exemplary embodiment of the present invention, which are applied to a front door boa and a rear door 10b, are identical in configuration to each other except that the shielding structures have directions opposite to each other. In addition, the shielding structure according to an exemplary embodiment of the present invention may be applied to a vehicle without limitation as long as the vehicle is equipped with sliding doors. In the present specification, it is described that the shielding structure according to an exemplary embodiment of the present invention is applied to a vehicle equipped with opposite sliding doors.

Referring to FIGS. 3 and 4, the structure for shielding a rail exposed to the outside of a sliding door vehicle according to an exemplary embodiment of the present invention includes a lower rail 120, a drive unit 130, a swing arm 140, guide units 150a and 150b, a shade bar 160, a cover 170, and a winding unit 180.

The lower rail 120 is mounted in a longitudinal direction of a vehicle body and disposed in an internal side sill space 60 formed in the vehicle body. The lower rail 120 has a roller groove.

The drive unit 130 is connected to the lower rail 120 so as to be movable along the lower rail 120. When a roller (not illustrated) provided on the drive unit 130 is inserted into the roller groove formed in the lower rail 120, the drive unit 130 is rollably connected to the lower rail 120.

One end of the swing arm 140 is rotatably connected to the drive unit 130, and the other end of the swing arm 140 is rotatably connected to the door 10. The swing arm 140 may rotate about a rotary shaft 143 of the swing arm in a direction in which the door 10 is closed and then take a lying posture with respect to the lower rail 120. Further, the swing arm 140 may rotate about the rotary shaft 143 of the swing arm in a direction in which the door 10 is opened and then take a standing posture with respect to the lower rail 120.

Figure 5:
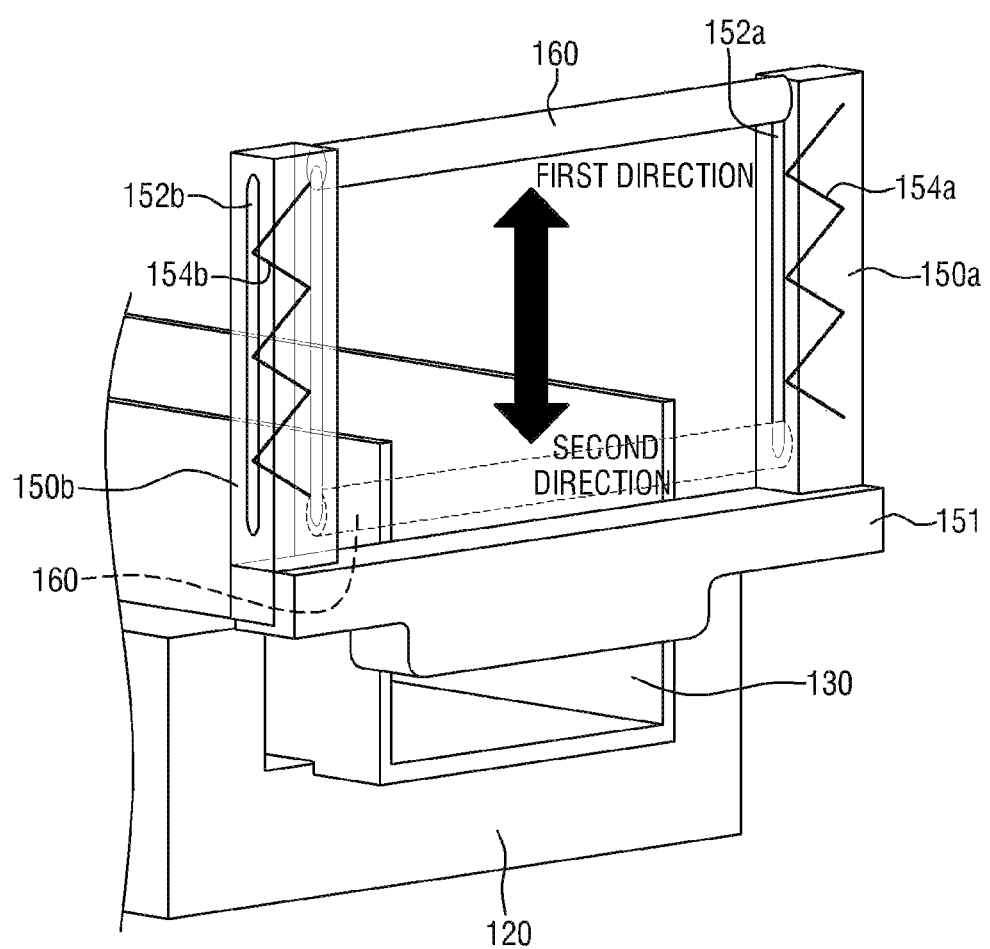
FIG. 5 is a view illustrating a state in which a shade bar connected to guide units according to another exemplary embodiment of the present invention moves.

FIG. 5 is a view illustrating a state in which a shade bar connected to guide units according to another exemplary embodiment of the present invention moves.

Referring to FIG. 5, the guide units 150a and 150b are provided side by side at both sides of the swing arm 140 and connected to the drive unit 130. One end of each of the guide units 150a and 150b is connected to a fixing unit 151, and the fixing unit 151 is fixed to the drive unit 130. In this case, each of the guide units 150a and 150b takes a posture approximately perpendicular to the drive unit 130. In this case, one end of each of the guide units 150a and 150b is a fixed end, and the other end of each of the guide units 150a and 150b is a free end. The guide units 150a and 150b are fixed to the drive unit 130 through the fixing unit 151, such that the guide units 150a and 150b, together with the drive unit 130, may move along the lower rail 120.

Movement paths 152a and 152b are formed in the guide units 150a and 150b and disposed in a longitudinal direction of the guide units 150a and 150b. Each of the movement paths 152a and 152b is a movement route for the shade bar 160. The movement paths 152a and 152b may be formed in the guide units 150a and 150b and each have a hole or a groove into which the shade bar 160 may be inserted.

The guide units 150a and 150b are provided with first elastic members 154a and 154b in order to assist the shade bar 160 in elastically moving on the movement paths 152a and 152b. The first elastic members 154a and 154b apply elastic force to the shade bar 160 in a direction from the fixed ends to the free ends of the guide units 150a and 150b. In this case, the direction from the fixed end to the free end of each of the guide units 150a and 150b is defined as a first direction, and a direction from the free end to the fixed end of each of the guide units 150a and 150b is defined as a second direction. Meanwhile, the first direction is identical to a direction in which the shade bar 160 moves away from the lower rail 120, and the second direction is identical to a direction in which the shade bar 160 moves close to the lower rail 120.

The two ends of the shade bar 160 are inserted into the movement paths 152a and 152b of the guide units 150a and 150b, respectively, so that the shade bar 160 takes a posture that traverses the lower rail 120. Therefore, the shade bar 160 moves along the movement paths 152a and 152b by being guided by the guide units 150a and 150b. As described above, since the first elastic members 154a and 154b apply the elastic force to the shade bar 160, the shade bar 160 is moved in the first direction by the elastic force from the first elastic members 154a and 154b when no external force is applied, in the second direction, to the shade bar 160 inserted into the guide units 150a and 150b. FIG. 5 illustrates a state in which the shade bar 160 moves in the first direction or the second direction.

Figure 6:
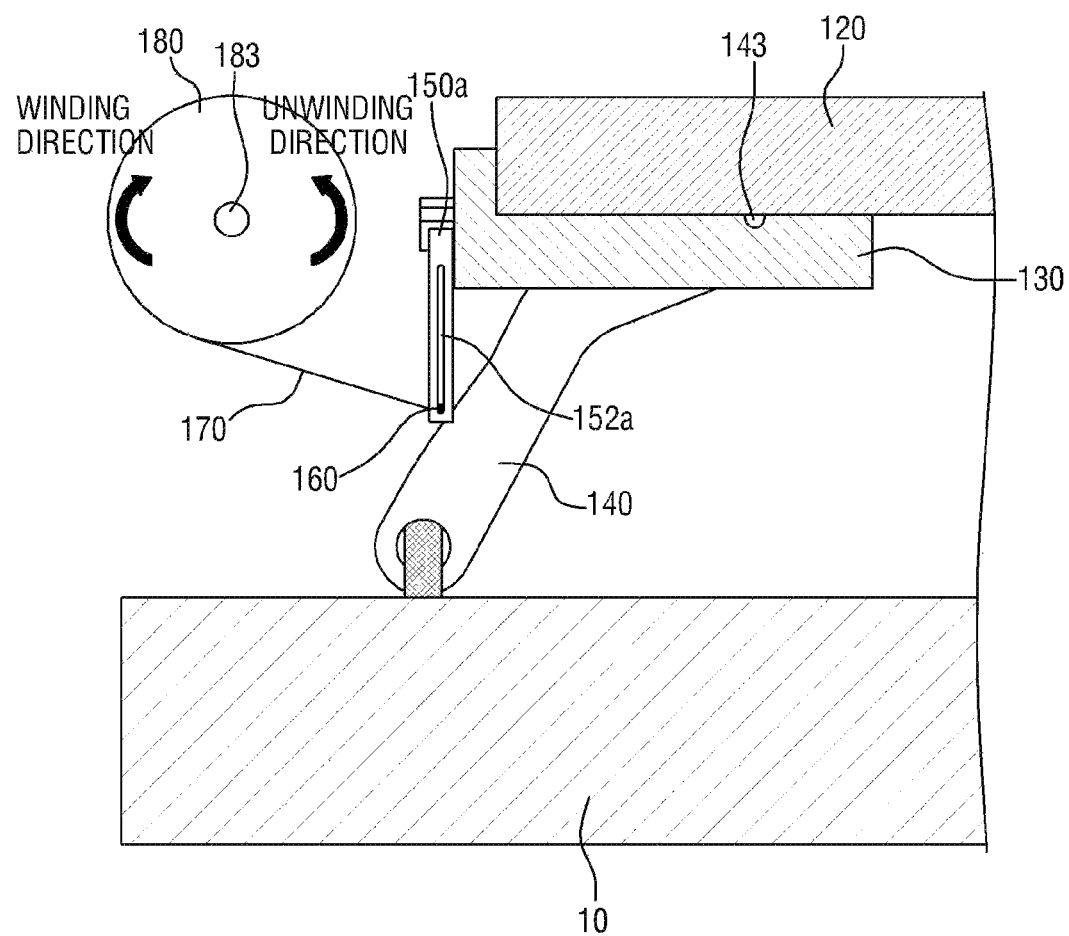
FIG. 6 is a view illustrating a state in which a swing arm illustrated in FIG. 4 rotates and the shade bar moves to one side.

FIG. 6 is a view illustrating a state in which the swing arm illustrated in FIG. 4 rotates and the shade bar moves to one side.

The swing arm 140 is positioned at one side of the shade bar 160 so as to press the shade bar 160 in the second direction. When the swing arm 140 rotates in one direction and presses the shade bar 160, the shade bar 160 may move in the second direction (see FIG. 4). In this state, when the swing arm 140 rotates in the other direction, the pressure applied to the shade bar 160 is eliminated such that the shade bar 160 may be moved in the first direction by the first elastic members 154a and 154b (see FIG. 6).

The cover 170 is configured to open or close the internal space 60 of the side sill 50 in which the lower rail 120 is mounted, and there is no limitation to a material and a shape of the cover 170. One end of the cover 170 is connected to the shade bar 160, and the other end of the cover 170 is connected to the winding unit 180.

The winding unit 180 may wind the cover 170. The winding unit 180 is positioned at one side of the lower rail 120 and rotatably connected to the vehicle body. The winding unit 180 may rotate about a rotary shaft 183 of the winding unit in a winding direction so as to wind the cover 170 or rotate in an unwinding direction so as to unwind the cover 170. In an exemplary embodiment of the present invention, the winding unit 180 has a cylindrical shape, but there is no limitation to a shape of the winding unit 180.

The winding unit 180 is provided with a second elastic member (not illustrated) in order to assist the elastic movement of the cover 170. The second elastic member (not illustrated) may be configured as a tube spring so that the cover 170 receives elastic force in the winding direction. When external force is applied to the winding unit 180 in the unwinding direction, the cover 170 is unwound from the winding unit 180 while overcoming the elastic force of the second elastic member (not illustrated). In this state, when the external force applied to the cover 170 is eliminated, the cover 170 is wound around the winding unit 180 by receiving the elastic force in the winding direction.

Figure 7A:
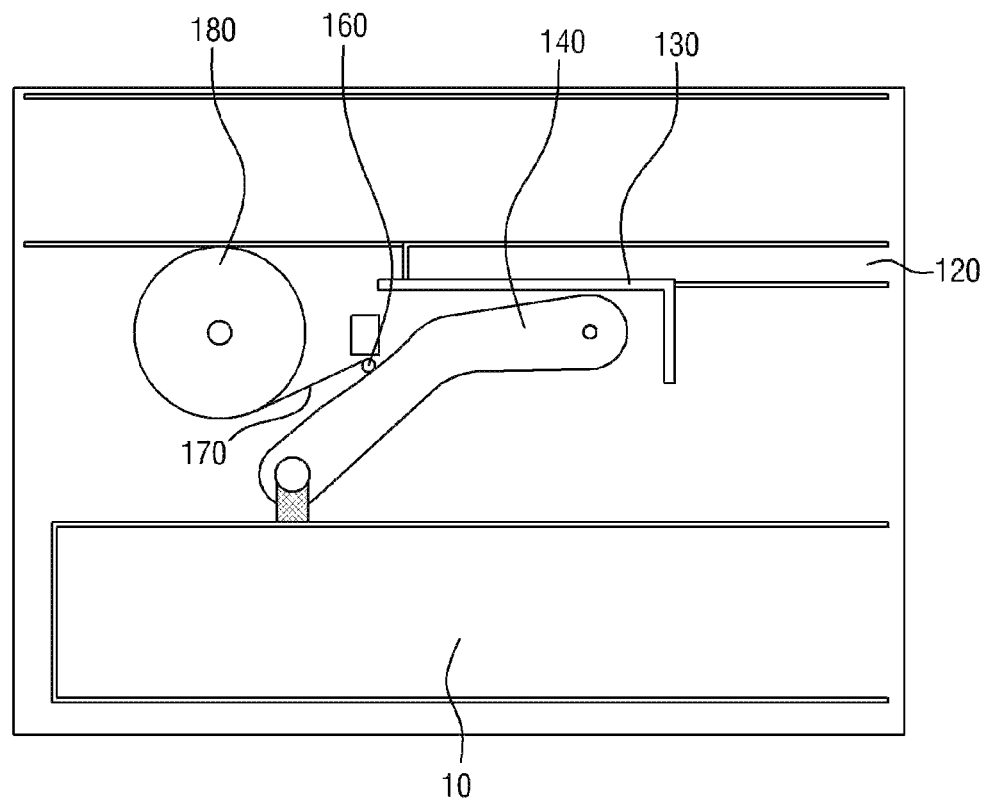
FIGS. 7A to 7C are views illustrating an operating process of the structure for shielding a rail exposed to the outside of a sliding door vehicle according to an exemplary embodiment of the present invention while a door moves from a closed state to an opened state.
Figure 7B:
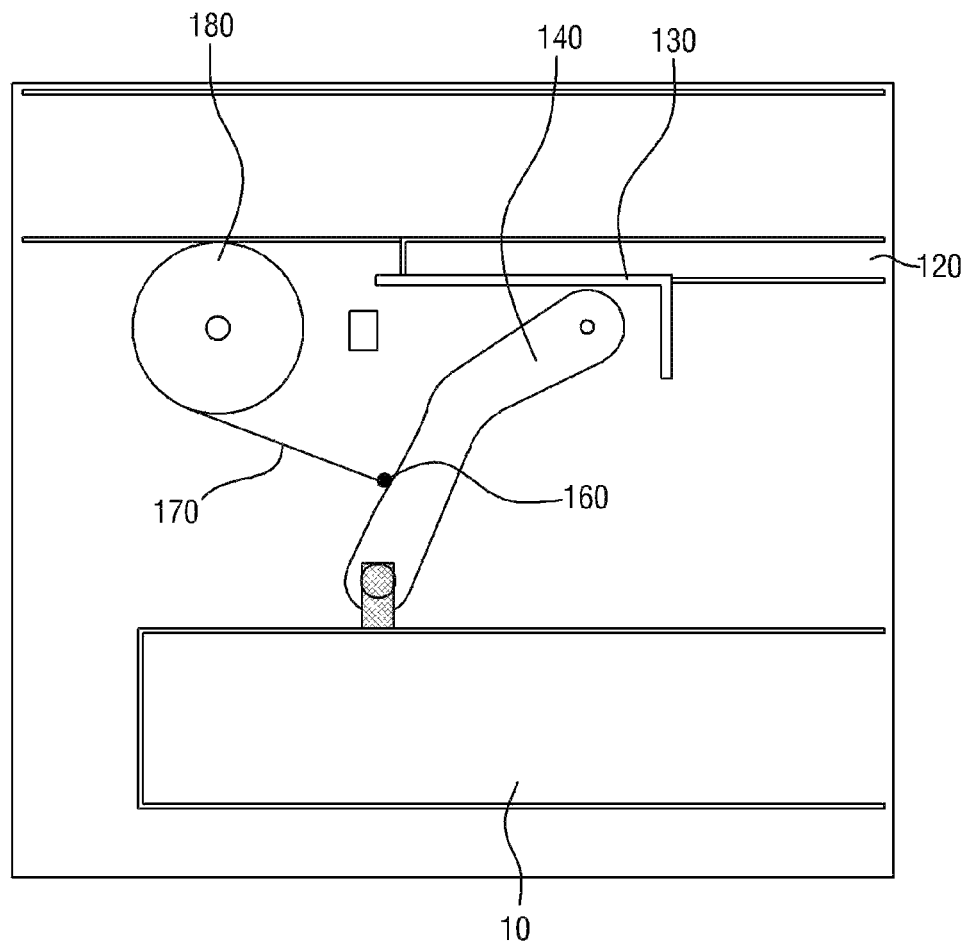
Figure 7C:
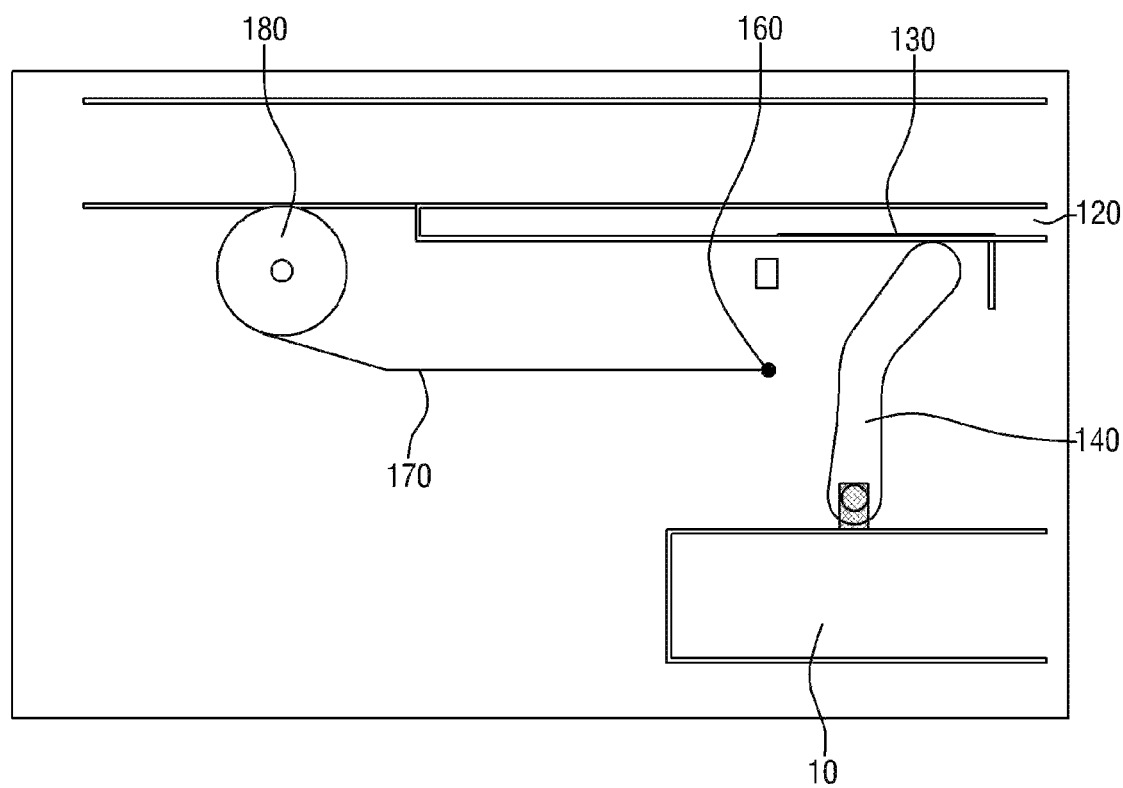

FIGS. 7A to 7C are views illustrating an operating process of the structure for shielding a rail exposed to the outside of a sliding door vehicle according to an exemplary embodiment of the present invention while a door moves from a closed state to an opened state. Meanwhile, for convenience of description, the guide units 150a and 150b are omitted from FIGS. 7A to 7C.

Hereinafter, an operating process of the structure for shielding a rail exposed to the outside of a sliding door vehicle according to an exemplary embodiment of the present invention will be described with reference to FIGS. 7A to 7C.

As illustrated in FIG. 7A, when the door 10 is in the closed state, the drive unit 130 is positioned at one side of the lower rail 120, and the swing arm 140 takes a lying posture with respect to the lower rail 120. In this case, because the swing arm 140 maximally presses the shade bar 160, the shade bar 160 is positioned close to the fixed ends of the guide units 150a and 150b. Most parts of the cover 170 are wound around the winding unit 180, and one end of the cover 170 is connected to the shade bar 160.

In this state, as illustrated in FIG. 7B, the swing arm 140 rotates when external force is applied in the direction in which the door 10 is opened. As such, the pressure applied to the shade bar 160 in the second direction is eliminated, and the shade bar 160 is moved in the first direction by the first elastic members 154a and 154b. In this case, one end of the cover 170 moves together with the shade bar 160.

In this state, when the external force is further applied in the direction in which the door 10 is opened, the swing arm 140 takes a standing posture with respect to the lower rail 120 and does not rotate any further. In this case, the shade bar 160 moves in the first direction so as to be close to the free ends of the guide units 150a and 150b and then stops moving.

In this state, as illustrated in FIG. 7C, when the external force is further applied in the direction in which the door 10 is opened, the drive unit 130 moves along the lower rail 120. In this case, since the winding unit 180 is fixed to the vehicle body and the guide units 150a and 150b are fixed to the drive unit 130, the cover 170 is unwound from the winding unit 180 and moved by the drive unit 130. As a result, the cover 170 shields the internal space 60 of the side sill 50 while the door 10 moves.

Meanwhile, an operating process of the structure for shielding a rail exposed to the outside of a sliding door vehicle according to an exemplary embodiment of the present invention while the door 10 moves from the opened state to the closed state may be performed by reversely performing the above-mentioned process.

Figure 8:
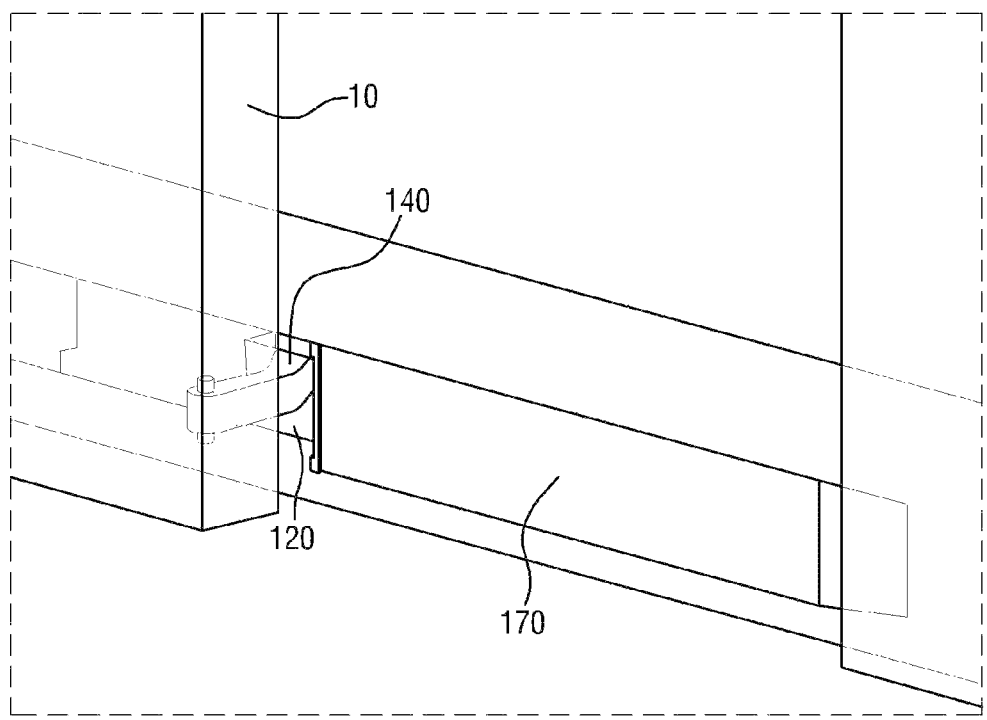
FIG. 8 is a view illustrating a state in which the structure for shielding a rail exposed to the outside of a sliding door vehicle according to an exemplary embodiment of the present invention shields a side sill.

FIG. 8 is a view illustrating a state in which the structure for shielding a rail exposed to the outside of a sliding door vehicle according to an exemplary embodiment of the present invention shields a side sill.

As illustrated in FIG. 8, the cover 170 may shield the internal space 60 of the side sill 50 by being moved by the drive unit 130, thereby preventing foreign substances from entering the side sill 50 when the door 10 is opened.

Since the winding unit 180 around which the cover 170 is wound is separately configured at one side of the lower rail 120, the cover 170 may be easily replaced when the cover 170 is damaged. In addition, the cover 170 may be easily moved by the guide units 150a and 150b and the shade bar 160, thereby simplifying the operation method.

Meanwhile, FIG. 8 illustrates the configuration in which the structure for shielding a rail exposed to the outside according to an exemplary embodiment of the present invention is applied to the single sliding door, but the present invention may also be applied to opposite sliding doors. In this case, the shielding structures applied to the opposite sliding doors have the same configuration but are disposed in opposite directions.

The present invention has been described with reference to the limited exemplary embodiments and the drawings, but the present invention is not limited thereto. The described exemplary embodiments may be variously changed or modified by those skilled in the art to which the present invention pertains within the technical spirit of the present invention and within the scope equivalent to the appended claims.

What is claimed is:

1. A structure for use with a sliding door of a vehicle, the structure comprising:
    a rail configured to be mounted on a vehicle body;
    a drive unit movably connected to the rail;
    a swing arm rotatably connected to the drive unit and configured to be connected to the sliding door;
    a shade bar configured to be in contact with the swing arm and connected to the drive unit so as to be movable in a first direction in which the shade bar moves towards the rail or a second direction in which the shade bar moves away from the rail; and
    a cover having a first end connected to the shade bar, the cover configured to open or close a space between an end of the shade bar and the rail upon movement of the drive unit.

2. The structure of claim 1, wherein the rail is configured to be mounted in an internal space of a side sill.

3. The structure of claim 1, further comprising guide units connected to the drive unit and configured to guide a movement of the shade bar.

4. The structure of claim 3, wherein the guide units are provided at both sides of the swing arm.

5. The structure of claim 3, further comprising a fixing unit fixed to the drive unit to support the guide units.

6. The structure of claim 3, wherein the guide units comprise movement paths along which the shade bar is movable when opposite ends of the shade bar are inserted into the movement paths.

7. The structure of claim 3, wherein each of the guide units is provided with an elastic member that applies elastic force to the shade bar in the second direction in which the shade bar moves away from the rail.

8. A structure comprising:
a rail configured to be mounted on a vehicle body;
a drive unit movably connected to the rail;
a swing arm rotatably connected to the drive unit and configured to be connected to a sliding door;
a shade bar configured to be in contact with the swing arm and connected to the drive unit so as to be movable in a first direction in which the shade bar moves towards the rail or a second direction in which the shade bar moves away from the rail;
a cover having a first end connected to the shade bar, the cover configured to open or close a space between an end of the shade bar and the rail upon movement of the drive unit; and
a winding unit configured to be rotatably connected to the vehicle body, wherein the cover is wound around the winding unit.

9. The structure of claim 8, wherein the winding unit is provided with an elastic member configured to apply elastic force in a direction in which the cover is wound.

10. The structure of claim 8, wherein the winding unit is formed in a cylindrical shape.

11. The structure of claim 8, wherein the rail is configured to be mounted in an internal space of a side sill.

12. The structure of claim 8, further comprising guide units connected to the drive unit and configured to guide a movement of the shade bar.

13. The structure of claim 12, wherein the guide units are provided at both sides of the swing arm.

14. The structure of claim 12, further comprising a fixing unit fixed to the drive unit to support the guide units.

15. A vehicle comprising:
a vehicle body including a side sill;
a sliding door coupled to the vehicle body;
a rail mounted on the vehicle body in an internal space of the side sill;
a drive unit movably connected to the rail;
a swing arm rotatably connected to the drive unit and the sliding door;
a shade bar configured to be in contact with the swing arm and connected to the drive unit, wherein the shade bar is configured to be movable in a first direction in which the shade bar moves towards the rail or a second direction in which the shade bar moves away from the rail; and
a cover having a first end connected to the shade bar, the cover configured to open or close a space between an end of the shade bar and the rail upon movement of the drive unit.

16. The vehicle of claim 15, further comprising:
guide units connected to the drive unit and configured to guide a movement of the shade bar; and
a fixing unit fixed to the drive unit to support the guide unit.

17. The vehicle of claim 16, wherein the guide units are provided at both sides of the swing arm and comprise movement paths along which the shade bar is movable when opposite ends of the shade bar are inserted into the movement paths.

18. The vehicle of claim 16, wherein each of the guide units is provided with an elastic member that applies elastic force to the shade bar in the second direction in which the shade bar moves away from the rail.

19. The vehicle of claim 15, further comprising a winding unit configured to be rotatably connected to the vehicle body, wherein the cover is wound around the winding unit.

20. The vehicle of claim 19, wherein the winding unit has a cylindrical shape and is provided with an elastic member configured to apply elastic force in a direction in which the cover is wound.

* * * * *